Oct. 23, 1934.   C. ROSENBLAD   1,977,921
DRAINING DEVICE
Filed Dec. 3, 1932
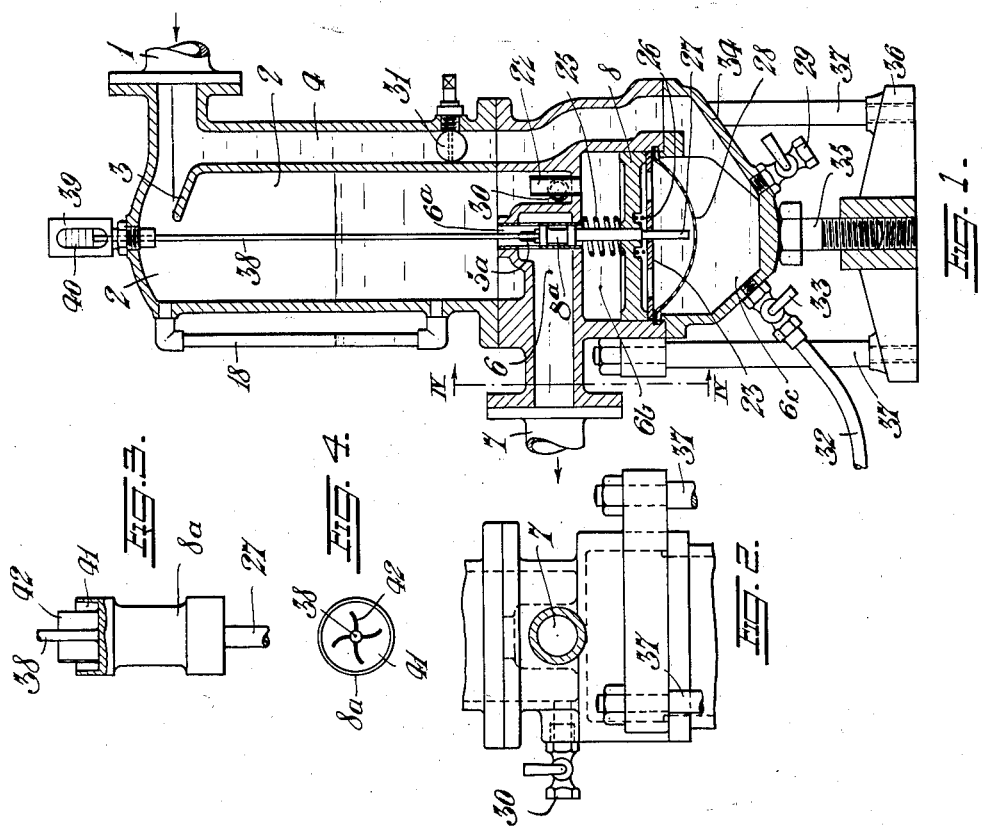
Inventor
Curt Rosenblad
By Sommers + Young
attys.

Patented Oct. 23, 1934

1,977,921

UNITED STATES PATENT OFFICE 1,977,921

DRAINING DEVICE

Curt Rosenblad, Stockholm, Sweden

Application December 3, 1932, Serial No. 645,626
In Sweden December 9, 1931

14 Claims. (Cl. 137—103)

This invention refers to draining devices, such as condensate dischargers, and more particularly to such devices having a valve opened and closed in dependence on the level of the liquid in the device. For such purpose dischargers were heretofore used having the discharge valve or valves controlled by a float on the liquid in the discharger. Said float control suffers, however, from serious drawbacks, one of which is that the float is subject to corrosion or other damages which easily put the float out of operation and cause disturbances.

The chief object of this invention is to overcome such drawbacks and construct a reliable draining device without any float.

A further object of this invention is to construct such devices so as not to be subject to corrosion, damages and the like and thus safe in operation.

A further object of this invention is to construct the valve-controlling member as a piston permitting longer strokes of the valve and consequently a more sensible control.

A further object of this invention is to effect strong actuating forces on the valve by using, as a valve-controlling member, a piston having a great diameter in relation to that of the valve.

A further object of this invention is to cause strong controlling forces on the valve by using, as a valve-controlling member, a piston actuated by the liquid pressure in a discharger having a high level of liquid.

Other objects of the invention will be evident from the following specification and claims.

Some embodiments of the invention are illustrated in the annexed drawing.

Fig. 1 shows a vertical section through a condensate discharger in accordance with this invention.

Fig. 2 shows a detail in section on the line II—II in Fig. 1.

Fig. 3 shows, on a larger scale, a detail of the top of the upper piston in Fig. 1, partly in section.

Fig. 4 is a top view of the piston shown in Fig. 3.

Referring now to the drawing, 1 indicates an inlet tube for the condensate connected with the steam consumer or the steam pipe or the like from which the condensate is to be drained. The tube 1 discharges into a vertical chamber 2 forming the condensate discharge chamber proper. A small dam or shield 3 is provided in the tube 1 and before said dam a narrow vertical tube 4 is branched off. The chamber 2 discharges via an outlet opening 5 through cylinder 6a into a lower chamber 6 having an outlet tube 7. A part 6b of said chamber 6 is cylinder-shaped and in that part a piston 8 is slidably mounted. The tube 4 discharges into the chamber 6 below the piston 8 which carries on its upper side a piston-like valve 8a opening and closing the opening 5.

The lower cylindrical portion 6b of chamber 6 has a greater diameter than the upper cylindrical portion 6a thereof which communicates directly with the interior of the chamber 2. In two diametrically opposite sides of the wall of the cylinder 6a slots 5a are cut extending vertically and forming a passage of communication between the interior of the cylinder 6a and that part of the chamber 6 to which the outlet tube 7 is connected. A tube 22 connects the upper end of the cylinder 6b with the chamber 2 laterally of the cylinder 6a.

In the cylinders 6a, 6b two pistons 8a, 8 are slidable and are rigidly interconnected. The smaller piston 8a in the cylinder 6a serves as a valve and is provided with piston rings sealing between said piston and the cylinder 6a. The piston 8 will provide the necessary actuating force on account of the difference between the levels of the liquids in the chamber 2 and the tube 4 and will slide easily in the cylinder 6b. The quantity of liquid leaking upwards between the piston 8 and the cylinder 6b escapes through the tube 22 to the chamber 2.

At the lower end of the chamber 6b a perforated disc 23 is inserted, which serves to limit the stroke of the piston 8 downwards. Between said piston 8 and the top wall of the cylinder 6b and also between said piston and the disc 23 helical springs 25 and 26 are inserted encircling the rod 27 connecting the two pistons 8a and 8. Said rod is guided in the disc 23. Thus, the piston 8 is guided on its upper side by the piston 8a in the cylinder 6a and on its lower side by the rod 27 running in the disk 23. The play between the piston 8 and the cylinder 6b may then be so great that there is no contact between them and the piston 8 will move very easily, because there is friction only in the guides 8a, 6a and 23, 27.

To prevent impurities from entering between the surfaces of guide a gauze net 28 is secured to the lower side of the disc 23. Furthermore, the chamber 6 is enlarged below the piston 8 to form a mud chamber 6c, in which the impurities following the condensate from the pipe 4 will settle and may be removed by means of the blow-off or mud cock 29. Also from the condensate chamber 2 the impurities settled may be blown off through the valve 30.

The tube 4 has a valve 31 and a tube 32 having a valve 33 for pure water of a pressure higher than that in the discharger is connected with chamber 6c. The bottom 34 of chamber 6c is removable and secured by means of a central screw bolt 35 screwed into a base plate 36 carrying the discharger by means of standards 37. After screwing the bolt 35 downward the bottom 34 may be removed for cleaning purposes without any further disassembling of the device.

A rod 38 is secured to the top of the piston 8a and extends upwards into a glass holder 39 enclosing its upper end. The glass is provided with a scale 40 on which the position of the upper end of the rod 38 and thus of the pistons 8a, 8 may be read.

The valve piston 8a is, as best seen from Figs. 3 and 4 at its upper end provided with a recess 41, so that said upper end forms a hollow cylinder having thin walls. When the liquid flows off through the slots 5a the dynamic forces generated when the flow is deflected laterally will have an axial component acting upon the piston 8a. Said axial component will then act upon the relatively narrow upper edge of the piston 8a and is reduced to a minimum which is important particularly if the drop of pressure in the slots 5a is high. On the upper side of the piston 8a also a number of bent wings or blades 42 are secured to cause the pistons 8a, 8 to rotate, when the blades are actuated by the flow of condensate drawn off through the slots 5a. Said rotation aids in preventing jamming of the pistons 8a, 8.

The device described acts as follows:

The condensate or liquid flowing through the tube 1 is dammed up somewhat by the shield 3 so that the tube 4 is rapidly filled. Said shield should not be so high as to cause any appreciable dynamic drop of pressure. Thus, the pressure of the liquid column in the tube 4 acts permanently on the lower side of the piston 8 as long as there is any condensate at all in the apparatus. If the chamber 2 is empty, the liquid pressure in the tube 4 will close the piston valve 8a and keep it closed until so much condensate has accumulated in the chamber 2 that the pressure of the liquid column in said chamber 2 on the piston 8a together with the combined weights of pistons 8 and 8a will suffice to overcome the pressure of the liquid column of the tube 4 on the piston 8. Then the piston valve 8a will be opened and the condensate discharged through the tube 7 until the liquid column of tube 4 again can close the valve 8a. Because jamming of the pistons 8a, 8 is prevented by the great play between the piston 8 and the cylinder 6b, by the straining out of mud by means of the net 28 and by the rotary motion of the pistons, the condensate discharger according to this invention is especially suitable, when the condensate contains mud or other impurities and in other cases of heavy duty. Because the diameter of the piston 8 is many times greater than that of the piston 8a the forces actuating the latter to open and close the slots 5a are very great and, therefore, jamming is further counteracted. This discharger is, therefore, particularly adapted for heavy duty, thus, for draining impure condensate, for draining when the difference between the pressures before and behind the discharger is great or in cases in which the discharge valve must seal absolutely perfectly.

The discharger automatically works to maintain the level of the liquid in the condensate chamber 2 at a constant height and said level is, by preference chosen to be half-way up the chamber. Because the slots 5a are diametrically opposite to each other, no lateral forces act upon the piston 8a. In its upper position said piston closes the slots 5a entirely, thus preventing losses of steam. The springs 25 and 26 tend to prevent the pistons from being jammed in their extreme positions. If, however, the pistons should be jammed, they may be loosened again by means of the valves 29, 31, 33. If the pistons are jammed in their lowermost position, the valve 31 is closed and high pressure water is supplied by opening the cock 33 to press the pistons upwards strongly. If on the contrary the pistons are jammed in their uppermost position, the valve 31 is closed and the valve 29 is opened, while the cock 33 remains closed. Thus, the pressure on the lower side of the piston 8 is relieved and the pistons are pressed downward by the condensate in the chamber 2 and the steam pressure prevailing on the surface of said condensate. If the condensate is very impure, the valve or cock 33 may be permanently open to such extent that the supply of pure water to the chamber 6c is limited to a quantity not substantially greater than that leaking out between the piston 8 and the cylinder 6b. The pure water thus supplied will then entirely or to the very greatest part leak into the upper portion of the cylinder 6b above the piston 8, but will not rise in the pipe 4. Thus, corrosion of and deposits in the cylinder 6b are avoided, while it is simultaneously secured that the piston 8 is raised to its upper position also if the quantity of condensate supplied is too little to raise the pistons.

To increase the force actuating the piston 8a said piston may be connected with the piston 8 by means of a lever mechanism. The said force may also be increased by increasing the height of the chamber 2 and the tube 4 and by increasing the diameter of the piston 8 in relation to that of the piston 8a. Thus, a discharger working satisfactorily also under extremely severe conditions of operation may be constructed. The pistons 8a, 8 may be made integral with each other and may have the same diameter, forming one single piston or plunger.

What I claim is:—

1. In a draining device, in combination, a cylinder, a piston slidable vertically in said cylinder, a condensate chamber communicating permanently with said cylinder above said piston, an inlet tube at the top of said chamber, an outlet tube at the bottom of said chamber, slots in said outlet tube, a piston valve in said outlet tube connected with said other piston to control said slots, and a pipe from said cylinder below said piston to said inlet tube.

2. In a draining device, in combination, a cylinder, a piston slidable vertically in said cylinder, a condensate chamber communicating with said cylinder above said piston, an inlet tube at the top of said chamber, an outlet tube at the bottom of said chamber, a valve in said outlet tube connected with and controlled by said piston, a mud chamber below said cylinder and in direct communication with the same, said mud chamber being formed by a detachable bottom piece, secured by means of one single bolt and a pressure pipe from said inlet tube to said cylinder below said piston.

3. In a condensate discharger, in combination, a condensate chamber, an inlet to said chamber, a vertical cylinder having two parts of different diameters in direct communication with said chamber and placed below the same, one piston in each of said cylinder parts, said pistons being rigidly interconnected, a number of outlet slots in the uppermost of said cylinder parts, a tube between the lowermost of said cylinder parts and said chamber, and a pipe from said inlet to said lowermost cylinder part below the piston therein.

4. In a draining device, in combination, a condensate chamber, an inlet to said chamber at the top thereof, coaxial vertical upper and lower cylinders below said chamber and in direct communication therewith, interconnected pistons in said cylinders, a number of outlet slots in the wall of said upper cylinder to be controlled by said pistons, a pressure pipe from said inlet down to said lower cylinder below the piston therein, a perforated disk secured to the lower end of said lower cylinder, and a guide rod secured to said pistons and guided in a hole in said disk.

5. In a draining device, in combination, a condensate chamber, an inlet to said chamber at the top thereof, coaxial vertical upper and lower cylinders below said chamber and in direct communication therewith, interconnected pistons in said cylinders, a number of outlet slots in the wall of said upper cylinder to be controlled by said pistons, a pressure pipe from said inlet down to said lower cylinder below the piston therein, and springs on at least one side of the piston in said lower cylinder.

6. In a draining device, in combination, a condensate chamber, an inlet to said chamber at the top thereof, coaxial vertical upper and lower cylinders below said chamber and in direct communication therewith, interconnected pistons in said cylinders, a number of outlet slots in the wall of said upper cylinder to be controlled by said pistons, a pressure pipe from said inlet down to said lower cylinder below the piston therewith, and a recess on the upper end of the piston in said upper cylinder.

7. In a draining device, in combination, a condensate chamber, an inlet to said chamber at the top thereof, coaxial vertical upper and lower cylinders below said chamber and in direct communication therewith, interconnected pistons in said cylinders, a number of outlet slots in the wall of said upper cylinder to be controlled by said pistons, a pressure pipe from said inlet down to said lower cylinder below the piston therein, and curved blades on the upper end of the piston in said upper cylinder.

8. In a draining device, in combination, a cylinder having two parts of different diameters, a piston having two parts of different diameters sliding vertically in said cylinder, a condensate chamber communicating permanently with both parts of said cylinder above said piston, an inlet to said condensate chamber, the narrow part of said cylinder having an outlet port, and a pipe from said inlet to the wide part of said cylinder below said piston therein.

9. In a draining device, in combination, a cylinder having two parts of different diameters, a piston having two parts of different diameters sliding vertically in said cylinder, a condensate chamber communicating permanently with both parts of said cylinder above said piston, an inlet to said condensate chamber, the narrow part of said cylinder having outlet ports, a pipe from said inlet to the wide part of said cylinder below said piston therein, and a dam in said inlet between said chamber and the point of connection of said pipe.

10. In a draining device, in combination, a cylinder having two parts of different diameters, a piston having two parts of different diameters sliding vertically in said cylinder, a condensate chamber communicating with both parts of said cylinder above said piston, an inlet to said condensate chamber, the narrow part of said cylinder having outlet ports, a pipe from said inlet to the wide part of said cylinder below said piston therein, and a rod on said piston extending into a graduated glass holder for visibly indicating the position of the piston.

11. In a draining device, in combination, a cylinder having two parts of different diameters, a piston having two parts of different diameters sliding vertically in said cylinder, a condensate chamber communicating with both parts of said cylinder above said piston, an inlet to said condensate chamber, the narrow part of said cylinder having outlet ports, a pipe from said inlet to the wide part of said cylinder below said piston therein, and a mud chamber below said cylinder and in direct communication with the same, said mud chamber being formed by a detachable bottom piece secured by means of one single bolt.

12. In a draining device, in combination, a cylinder having two parts of different diameters, a piston having two parts of different diameters sliding vertically in said cylinder, a condensate chamber communicating with both parts of said cylinder above said piston, an inlet to said condensate chamber, the narrow part of said cylinder having outlet ports, a pipe from said inlet to the wide part of said cylinder below said piston therein and a perforated disk secured to the lower end of said cylinder, and a guide rod secured to said piston in a hole in said disk.

13. In a draining device, in combination, a cylinder having two parts of different diameters, a piston having two parts of different diameters sliding vertically in said cylinder, a condensate chamber communicating with both parts of said cylinder above said piston, an inlet to said condensate chamber, the narrow part of said cylinder having outlet ports, a pipe from said inlet to the wide part of said cylinder below said piston therein, and a valved supply pipe for high pressure water to said cylinder adjacent to said pipe.

14. In a draining device, in combination, a cylinder having two parts of different diameters, a piston having two parts of different diameters slidable in said cylinder parts, a condensate chamber above said cylinder and in direct communition with said cylinder, an inlet tube to the top of said chamber, at least one outlet in the wall of said cylinder and controlled by said piston, a pressure pipe from said inlet to said cylinder, a supply pipe for high pressure water to said cylinder, and a throttle valve in said supply pipe to give the flow per unit of time from said pipe any desired value.

CURT ROSENBLAD.